(12) United States Patent
Polleros et al.

(10) Patent No.: US 11,140,483 B2
(45) Date of Patent: Oct. 5, 2021

(54) MANAGEMENT OF LOW FREQUENCY COMPONENTS OF AN AUDIO SIGNAL AT A MOBILE COMPUTING DEVICE

(71) Applicant: Maxim Integrated Products, Inc., San Jose, CA (US)

(72) Inventors: Robert Polleros, Sunnyvale, CA (US); Vivek P. Nigam, Dublin, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 0 days.

(21) Appl. No.: 16/809,146

(22) Filed: Mar. 4, 2020

(65) Prior Publication Data
US 2020/0288246 A1 Sep. 10, 2020

Related U.S. Application Data

(60) Provisional application No. 62/814,030, filed on Mar. 5, 2019.

(51) Int. Cl.
| | |
|---|---|
| *H04M 1/725* | (2021.01) |
| *H04R 3/14* | (2006.01) |
| *H04R 5/02* | (2006.01) |
| *H04S 1/00* | (2006.01) |
| *H04R 5/04* | (2006.01) |

(Continued)

(52) U.S. Cl.
CPC ............... *H04R 5/02* (2013.01); *H04R 1/025* (2013.01); *H04R 1/26* (2013.01); *H04R 3/04* (2013.01); *H04R 3/14* (2013.01); *H04R 5/04* (2013.01); *H04S 1/007* (2013.01); *H04S 7/30* (2013.01);

(Continued)

(58) Field of Classification Search
CPC ... H04R 5/02; H04R 3/04; H04R 3/14; H04R 5/04; H04R 1/025; H04R 1/26; H04R 2499/11; H04S 1/007; H04S 7/30; H04M 1/725

See application file for complete search history.

(56) References Cited

U.S. PATENT DOCUMENTS

| | | |
|---|---|---|
| 7,899,191 B2 | 3/2011 | Lakaniemi et al. |
| 8,050,424 B2 | 11/2011 | Noro |

(Continued)

*Primary Examiner* — Ping Lee
(74) *Attorney, Agent, or Firm* — Kevin E. West; Advent, LLP

(57) ABSTRACT

A mobile computing device includes a digital signal processor, a first speaker having a first sensitivity and a second speaker having a second sensitivity, where the second sensitivity is greater than the first sensitivity. The digital signal processor includes an audio signal manager that is configured to receive an audio signal having first and second channel signals, partition the first channel signal into a first high frequency signal and a first low frequency signal, partition the second channel signal into a second high frequency signal and a second low frequency signal, generate a mono low frequency signal based on the first and second low frequency signals, partition the mono low frequency signal into first and second mono low frequency signals based on an excursion limit of the second speaker, generate a first composite channel signal based on the first high frequency signal and the first mono low frequency signal for playback by the first speaker, and generate a second composite channel signal based on the second high frequency signal and the second mono low frequency signal for playback by the second speaker.

20 Claims, 5 Drawing Sheets

(51) Int. Cl.
*H04R 1/02* (2006.01)
*H04R 1/26* (2006.01)
*H04R 3/04* (2006.01)
*H04S 7/00* (2006.01)

(52) U.S. Cl.
CPC ......... *H04M 1/725* (2013.01); *H04R 2499/11* (2013.01)

(56) References Cited

U.S. PATENT DOCUMENTS

| | | |
|---|---|---|
| 8,150,068 B2 | 4/2012 | Konagai et al. |
| 9,414,160 B2 | 8/2016 | Van Schyndel et al. |
| 9,883,303 B2 | 1/2018 | Hashimoto et al. |
| 2015/0011264 A1* | 1/2015 | Macours ................ H03G 5/005 455/569.1 |

* cited by examiner

MANAGEMENT OF LOW FREQUENCY COMPONENTS OF AN AUDIO SIGNAL AT A MOBILE COMPUTING DEVICE

BACKGROUND

Mobile computing devices typically include audio systems. An example of a mobile computing device is a mobile phone. Such mobile computing devices often use different speakers for playback of stereo audio signals received at the audio system. In many cases, the different speakers have different sensitivities to the bass component of audio signals. For example, when a stereo audio signal transmitted via two audio channels is received for playback, the audio system routes the audio signal received via each of the audio channels to a different speaker for playback. The speaker with relatively lower sensitivity typically consumes relatively more power during the playback of audio signal than the speaker with the relatively higher sensitivity.

For example, a mobile phone typically has a receiver speaker and a micro speaker. The receiver speaker often has a greater sensitivity to the bass component of audio signals than the micro speaker. In such cases, the micro speaker typically consumes relatively more power during the playback of the bass component of the stereo audio signals than the receiver speaker.

DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
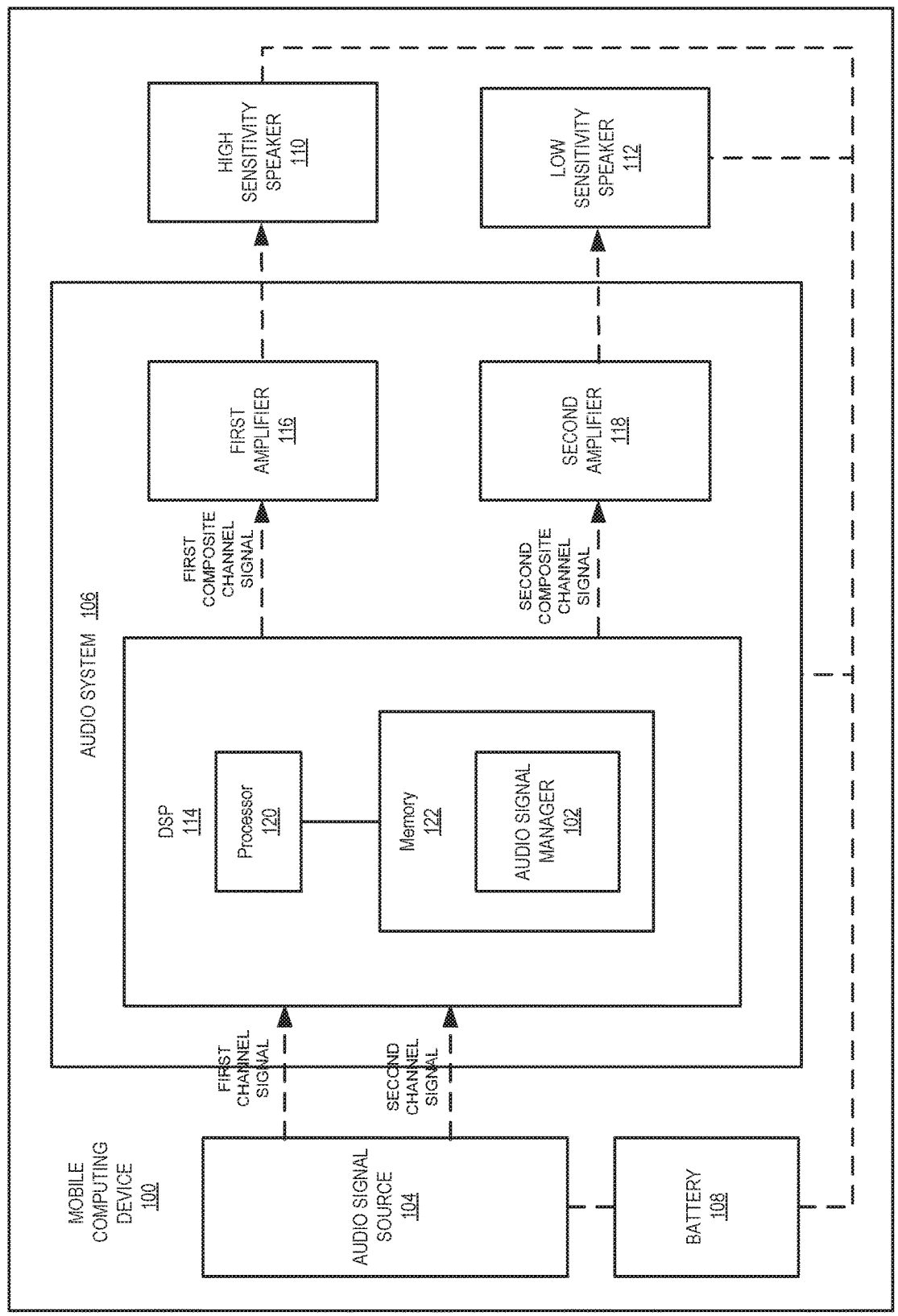
FIG. 1 is a block diagram representation of an example of a mobile computing device including an embodiment an audio signal manager.

Mobile computing devices often include multiple speakers, where each speaker has a different sensitivity to the bass component of audio signals. For example, a mobile phone includes a receiver speaker and a micro speaker. The receiver speaker has a greater sensitivity to the bass component of audio signals than the micro speaker. As a result, the receiver speaker is relatively more efficient at reproducing the bass component of audio signals than the micro speaker until the receiver speaker hits its excursion limit.

Audio signal sources often transmit stereo audio signals via two different channels. An audio signal manager is disposed within a digital signal processor of the mobile computing device audio system. The audio signal manager separates the bass components of the two different audio signals received via the two audio channels from the higher frequency components and uses the separated bass components to generate a mono bass signal. The mono bass signal is divided into two different mono bass signals based on the excursion limit of the receiver speaker. The portion of the mono bass signal that is within the excursion limit of the receiver speaker is routed to the receiver speaker for playback and the portion the bass signal that is above the excursion limit of the receiver speaker is routed to the micro speaker for playback. Maximizing the playback of the bass component of the two stereo audio signals at the receiver speaker typically results in a reduction in the combined power consumption by the receiver speaker and the micro speaker.

In an embodiment, a mobile computing device includes a first speaker, a second speaker, and an audio signal manager. The first speaker has a first sensitivity and the second speaker has a second sensitivity. The second sensitivity of the second speaker is greater than the first sensitivity of the first speaker. The audio signal manager is configured to receive an audio signal having first and second channel signals, partition the first channel signal into a first high frequency signal and a first low frequency signal, partition the second channel signal into a second high frequency signal and a second low frequency signal, generate a mono low frequency signal based on the first and second low frequency signals, partition the mono low frequency signal into first and second mono low frequency signals based on an excursion limit of the second speaker, generate a first composite channel signal based on the first high frequency signal and the first mono low frequency signal for playback by the first speaker, and a generate a second composite channel signal based on the second high frequency signal and the second mono low frequency signal for playback by the second speaker.

In an embodiment, a method of managing an audio signal at a mobile computing device includes receiving an audio signal having first and second channel signals at an audio signal manager, partitioning the first channel signal into a first high frequency signal and a first low frequency signal at the audio signal manager, partitioning the second channel signal into a second high frequency signal and a second low frequency signal at the audio signal manager, generating a mono low frequency signal based on the first and second low frequency signals at the audio signal manager, partitioning the mono low frequency signal into first and second mono low frequency signals based on an excursion limit of a first speaker at the audio signal manager, generating a first composite channel signal based on the first high frequency signal and the first mono low frequency signal for playback by the first speaker at the audio signal manager, and generating a second composite audio signal based on the second high frequency signal and the second mono low frequency signal for playback by a second speaker at the audio signal manager, wherein a sensitivity of the first speaker is greater than a sensitivity of the second speaker.

In an embodiment, a digital signal processor for a mobile computing device includes an audio signal manager. The audio signal manager includes at least one processor and at least one memory including computer program code. The at least one memory and the computer program code are configured to, with the at least one processor, to cause the audio signal manager to receive an audio signal having first and second channel signals, partition the first channel signal into a first high frequency signal and a first low frequency signal, partition the second channel signal into a second high frequency signal and a second low frequency signal, generate a composite mono low frequency signal based on the first and second low frequency signals, partition the composite mono low frequency signal into first and second mono low frequency signals based on an excursion limit of a first speaker, generate a first composite channel signal based on the first high frequency signal and the first mono low frequency signal for playback by the first speaker, and generate a second composite channel signal based on the second high frequency signal and the second mono low frequency signal for playback by a second speaker, wherein a sensitivity of the first speaker is greater than a sensitivity of the second speaker.

Example Implementations

Referring to FIG. 1, a block diagram representation of an example of a mobile computing device 100 including an embodiment an audio signal manager 102 is shown. The mobile computing device 100 includes an audio signal source 104, an audio system 106, a battery 108, a high sensitivity speaker 110, and a low sensitivity speaker 112. The audio signal manager 102 is stored at the mobile computing device 100. The high sensitivity speaker 110 has a relatively higher sensitivity to the bass component of audio signals than the low sensitivity speaker 112. Examples of audio signal sources 104 include, but are not limited to, a media player and an MP3 player. While different components of a mobile computing device 100 have been described, alternative embodiments of the mobile computing device 100 may include additional components that facilitate the operation of the mobile computing device 100.

In an embodiment, the mobile computing device 100 is a mobile phone, the high sensitivity speaker 108 is a receiver speaker of the mobile phone and the low sensitivity speaker 110 is a micro speaker of the mobile phone. The sensitivity of a speaker is a frequency specific parameter. The sensitivity of a speaker is in part based on an enclosure volume or baffle of the speaker. The micro speaker typically has a relatively smaller enclosure volume compared to that of the receiver speaker because while the micro speaker is enclosed by a micro speaker specific enclosure, the receiver speaker has an enclosure volume defined by a casing of the mobile phone. In some instances, the enclosure volume of the micro speaker may be approximately 1 cm$^3$ while the enclosure volume of the receiver speaker, defined by the casing of a mobile phone, may be approximately 100 cm$^3$. The difference in the enclosure volumes is reflected in the different frequency specific sensitivity values associated with the receiver speaker and the micro speaker. Since the receiver speaker has a relatively higher sensitivity that the micro speaker, the receiver speaker typically consumes relatively less power than a micro speaker during the playback of audio signals, especially the bass component of audio signals.

In an embodiment, the battery 108 supplies power to the audio signal source 104, the audio system 106, the high sensitivity speaker 110, and the low sensitivity speaker 112. Reducing the combined power consumption by the high sensitivity speaker 110 and the low sensitivity speaker 112 results in a reduction in the power drawn from the battery 108 during the playback of audio signals. While a battery 108 has been described as the power source used to supply power to the audio signal source 104, the audio system 106, the high sensitivity speaker 110 and the low sensitivity speaker 112, other types of portable energy sources may be used. An example of such a portable energy source is a photovoltaic cell.

The audio system 106 includes a digital signal processor (DSP) 114, a first amplifier 116, and a second amplifier 118. In an embodiment, the audio signal manager 102 is stored at the DSP 114. In an embodiment, the DSP 114 is configured to be communicatively coupled to the audio signal source 104, the first amplifier 116 and the second amplifier 118. In an embodiment, the DSP 114 is communicatively coupled to the audio signal source 104, the first amplifier 116 and the second amplifier 118. The first amplifier 116 is communicatively coupled to the high sensitivity speaker 110 and the second amplifier 118 is communicatively coupled to the low sensitivity speaker 112. While different components of the audio system 106 have been described, alternative embodiments of the audio system 106 may include additional components that facilitate the operation of the audio system 104.

The DSP 114 includes at least one processor 120 and at least one memory 122. In an embodiment, the audio signal manager 102 is stored in the memory 122. While different components of the DSP 114 have been described, alternative embodiments of the DSP 114 may include additional components that facilitate the operation of the DSP 114.

In an embodiment, DSP 114 of the audio system 106 receives stereo audio signals from the audio signal source 104 via at least two audio channels. In an embodiment, the stereo audio signal received from the audio signal source 104 includes a first channel signal and a second channel signal. Each of the first and second channel signals is transmitted from the audio signal source 104 to the DSP 114 via an associated independent audio channel. While the stereo audio signal is described as a stereo audio signal including two independent channel signals, the stereo audio signal may include a greater number of channel signals.

The audio signal manager 102 operates on a real time basis. The audio signal manager 102 processes the first and second channel signals as they are received at the DSP 114 and generates first and second composite channel signals for playback by the high sensitivity speaker 110 and the low frequency speaker 112, respectively, on a real time basis.

The audio signal manager 102 at the DSP 114 manipulates the low frequency components of the first and second channel signals. More specifically, the audio signal manager 102 separates the low frequency components of the first and second channel signals from the high frequency components of the first and second channel signals, respectively, and then aggregates the separated low frequency components of the first and second channel signals to generate a mono low frequency signal. The audio signal manager 102 partitions the mono low frequency signal into two different mono low frequency signals based on an excursion limit of the high sensitivity speaker 110. The audio signal manager 102 combines the portion of the mono low frequency signal that is within the excursion limit of the high sensitivity speaker 110 with the high frequency component that was previously separated from the first channel signal to generate the first composite channel signal. The first composite channel signal is transmitted to the first amplifier 116 for amplification. The first amplifier 116 transmits the amplified first composite channel signal to the high sensitivity speaker 110 for playback.

Similarly, the audio signal manager 102 combines the portion of the mono low frequency signal that falls above the excursion limit of the high sensitivity speaker 110 with the high frequency component that was previously separated from the second channel signal to generate the second composite channel signal. The second composite channel signal is transmitted to the second amplifier 118 for amplification. The second amplifier 118 transmits the amplified second composite channel signal to the low sensitivity speaker 112 for playback. The audio signal manager 102 manipulates the first and second channels signals to generate the first and second composite channel signals, such that the playback of the first and second composite channel signals by the high sensitivity speaker 110 and the low sensitivity speaker 112, respectively, results in a power consumption savings compared to a playback of the first and second channel signals by the high sensitivity speaker 110 and the low sensitivity speaker 112, respectively.

In an embodiment, the low frequency components of the first and second channel signals are the bass components of the first and second channel signals and the mono low frequency signal is a mono bass signal.

Figure 2:
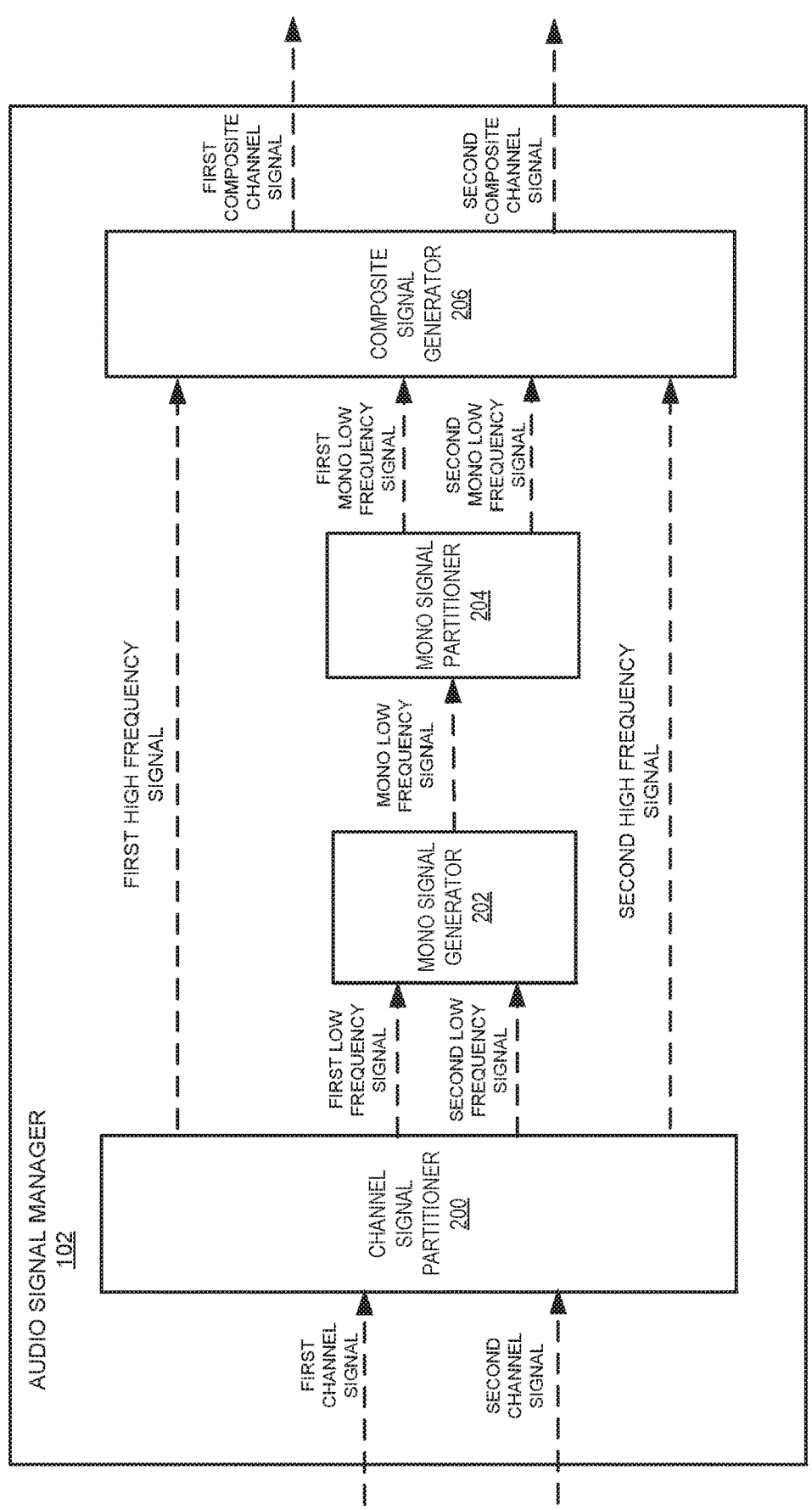
FIG. 2 is a block diagram representation of an embodiment of an audio signal manager.

Referring to FIG. 2, an embodiment of an audio signal manager 102 is shown. The audio signal manager 102 includes a channel signal partitioner 200, a mono signal generator 202, a mono signal partitioner 204, and a composite signal generator 206. While different components of the audio signal manager 102 have been described, alternative embodiments of the audio signal manager 102 may include additional components that facilitate the operation of the audio signal manager 102.

The channel signal partitioner 200 receives the first and second channels signals generated by the audio signal source 104 inputs. The channel signal partitioner 200 partitions the first channel signal into a first high frequency signal and a first low frequency signal. Similarly, the channel signal partitioner 200 partitions the second channel signal into a second high frequency signal and a second low frequency signal. In an embodiment, the first low frequency signal is a bass component of the first channel signal and the second low frequency signal is a bass component of the second channel signal.

The mono signal generator 202 receives the first and second low frequency signals as inputs. The mono signal generator 202 aggregates the first and second low frequency signals to generate a mono low frequency signal as an output. In an embodiment, the mono low frequency signal is a mono bass signal based on the bass components of the first and second channel signals.

The mono signal partitioner 204 receives the mono low frequency signal as an input. The mono signal partitioner 204 partitions the mono low frequency signal into first and second mono low frequency signals based on the excursion limit of the high sensitivity speaker 110. The excursion limit of the high sensitivity speaker 110 is quantified as an excursion amplitude threshold. The mono signal partitioner 204 compares the received mono low frequency signal to the excursion amplitude threshold. The portion of the mono low frequency signal that falls below excursion amplitude threshold is used to generate the first mono low frequency signal. The portion of the mono low frequency signal that is above excursion amplitude threshold is used to generate the second mono low frequency signal.

As mentioned above, the sensitivity of a speaker is a frequency specific parameter. The high sensitivity speaker 110 has a relatively higher sensitivity in reproducing relatively lower frequency audio signals that typically fall in the bass signal range of an audio signal than the low frequency speaker 112. The high sensitivity speaker 110 has an excursion limit that defines the maximum playback capability of the high sensitivity speaker 110. The mono signal partitioner 204 partitions the mono low frequency signal based on the excursion limit of the high sensitivity speaker 110. The mono signal partitioner 204 partitions the mono low frequency signal in a manner that maximizes the playback of the relatively low frequency audio signals (that are relatively more efficiently reproduced by the speaker with the greater sensitivity to the low frequency audio signals) by the high sensitivity speaker 110.

In an embodiment, the mono low frequency signal is a mono bass signal generated based on the bass components of the first and second channel signals. The mono signal partitioner 204 receives the mono bass signal as an input. The mono signal partitioner 204 partitions the mono bass signal into first and second mono bass signals based on the excursion limit of the high sensitivity speaker 110. The excursion limit of the high sensitivity speaker 110 is quantified as an excursion amplitude threshold. The mono signal partitioner 204 compares the received mono bass signal to the excursion amplitude threshold. The portion of the mono bass signal that falls below excursion amplitude threshold is used to generate the first mono bass signal. The portion of the mono bass signal that is above excursion amplitude threshold is used to generate the second mono bass signal.

The composite signal generator 206 receives the first and second high frequency signals generated by the channel signal partitioner 200 and the first and second mono low frequency signals generated by the mono signal partitioner 204 as inputs and generates the first and second composite channel signals.

More specifically, the composite signal generator 206 generates the first composite channel signal based on the first high frequency signal and the first mono low frequency signal. The first high frequency signal is the high frequency component of the first channel signal. The first mono low frequency signal is the portion of the mono low frequency signal that falls below excursion amplitude threshold associated with the excursion limit of the high frequency speaker 110. The DSP 114 transmits the first composite channel signal to the first amplifier 116 for amplification. The first amplifier 116 transmits the amplified first composite channel signal to the high sensitivity speaker 110 for reproduction.

Similarly, the composite signal generator 206 generates the second composite channel signal based on the second high frequency signal and the second mono low frequency signal. The second high frequency signal is the high frequency component of the second channel signal. The second mono low frequency signal is the portion of the mono low frequency signal that is above excursion amplitude threshold associated with the excursion limit of the high frequency speaker 110. The DSP 114 transmits the second composite channel signal to the second amplifier 118 for amplification. The second amplifier 118 transmits the amplified second composite channel signal to the low sensitivity speaker 112 for reproduction.

The first and second high frequency signals, the high frequency components of the first and second channel signals, are typically directional audio signals. The first and second low frequency signals, the low frequency components of the first and second channel signals, are typically omni-directional audio signals. The first and second composite channel signals maintain the directional high frequency components of the first and second channel signals while incorporating the first and second mono low frequency signals based on the omni-directional low frequency components of the first and second channel signals.

The end user is typically unable to discern a difference between a reproduction of the first and second channel signals by the high sensitivity speaker 110 and the low frequency speaker 112, respectively, and a reproduction of the first and second composite channel signals by the high sensitivity speaker 110 and the low frequency speaker 112, respectively. The manipulation of the low frequency components of the first and second channels signals based on the excursion limit of the high sensitivity speaker 110 to generate the first and second composite channel signals for playback by the high sensitivity speaker 110 and the low sensitivity speaker 112, respectively, results in relatively lower combined power consumption by the high sensitivity speaker 110 and the low sensitivity speaker 112.

In an embodiment, the first and second mono low frequency signals generated by the mono signal partitioner 204 are first and second mono bass signals. The composite signal generator 206 generates the first composite channel signal based on the first high frequency signal and the first mono bass signal. The first high frequency signal is the high frequency component of the first channel signal. The first mono bass signal is the portion of the mono bass signal that falls below excursion amplitude threshold associated with the excursion limit of the high frequency speaker 110. The DSP 114 transmits the first composite channel signal to the first amplifier 116 for amplification. The first amplifier 116 transmits the amplified first composite channel signal to the high sensitivity speaker 110 for reproduction.

Similarly, the composite signal generator 206 generates the second composite channel signal based on the second high frequency signal and the second mono bass signal. The second high frequency signal is the high frequency component of the second channel signal. The second mono bass signal is the portion of the mono bass signal that is above excursion amplitude threshold associated with the excursion limit of the high frequency speaker 110. The DSP 114 transmits the second composite channel signal to the second amplifier 118 for amplification. The second amplifier 118 transmits the amplified second composite channel signal to the low sensitivity speaker 112 for reproduction.

Figure 3:
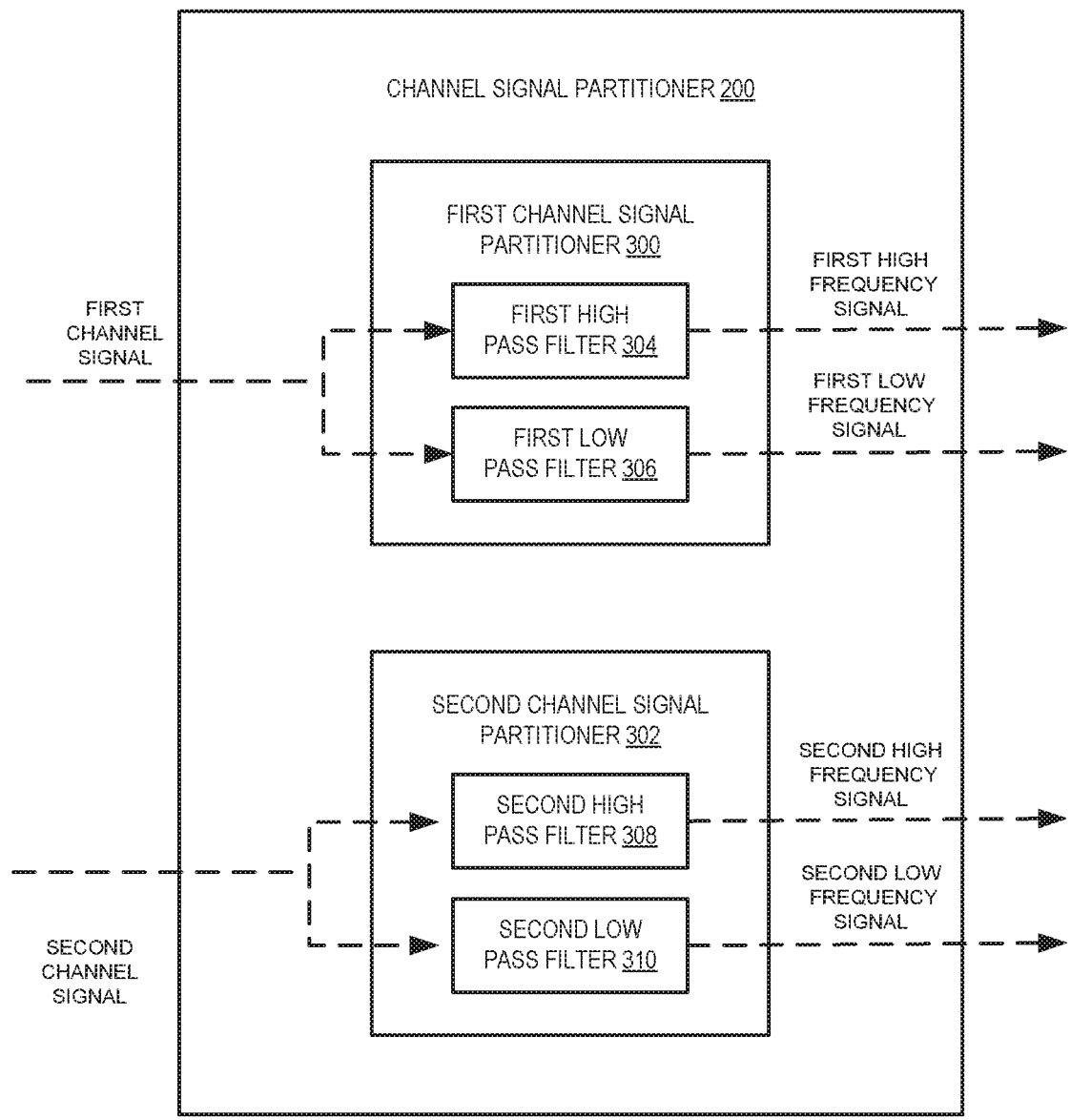
FIG. 3 is a block diagram representation of an embodiment of a channel signal partitioner.

Referring to FIG. 3, a block diagram representation of an embodiment of a channel signal partitioner 200 is shown. The channel signal partitioner 200 receives the first and second channel signals from the audio signal source 104 as input signals and generates the first high frequency signal, the first low frequency signal, the second high frequency signal and the second low frequency signal as output signals.

The channel signal partitioner 200 includes a first channel signal partitioner 300 and a second channel signal partitioner 302. The first channel signal partitioner 300 partitions the first channel signal into the first high frequency signal and the first low frequency signal. The first channel signal partitioner 300 includes a first high pass filter 304 and a first low pass filter 306. The first high pass filter 304 receives the first channel signal as an input and filters low frequency component of the first channel signal to generate the first high frequency signal. The first low pass filter 306 receives the first channel signal as an input and filters high frequency component of the first channel signal to generate the first low frequency signal. The first channel signal partitioner 302 transmits the first high frequency signal to the composite signal generator 206 and the first low frequency signal to the mono signal generator 202. In an embodiment, the first low frequency signal is the bass component of the first channel signal.

The second channel signal partitioner 302 partitions the second channel signal into the second high frequency signal and the second low frequency signal. The second channel signal partitioner 302 includes a second high pass filter 308 and a second low pass filter 310. The second high pass filter 308 receives the second channel signal as an input and filters low frequency component of the second channel signal to generate the second high frequency signal. The second low pass filter 310 receives the second channel signal as an input and filters high frequency component of the second channel signal to generate the second low frequency signal. The second channel signal partitioner 302 transmits the second high frequency signal to the composite signal generator 206 and the second low frequency signal to the mono signal generator 202. In an embodiment, the second low frequency signal is the bass component of the second channel signal.

While one configuration of a channel signal partitioner 200 for partitioning first and second channel signals into the first high frequency signal, the first low frequency signal, the second high frequency signal and the second low frequency signal has been described, alternative embodiments of the channel signal partitioner 200 may include different components and/or be arranged in different configurations.

Figure 4:
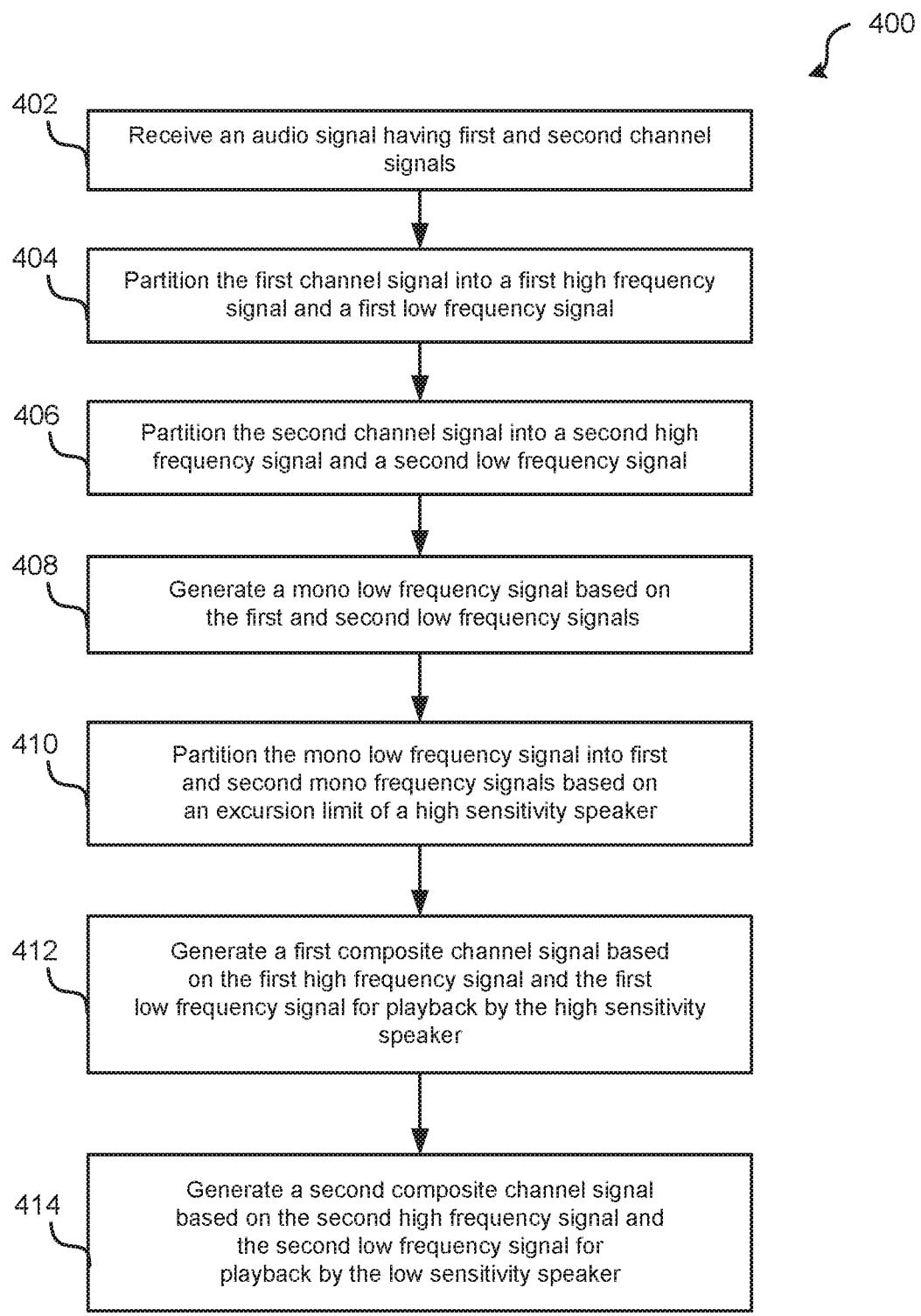
FIG. 4 is a flow chart representation of a method of implementing an embodiment of an audio signal manager in a mobile computing device.

Referring to FIG. 4, a flow chart representation of a method 400 of implementing an embodiment of an audio signal manager 102 in a mobile computing device 100 is shown. At 402, an audio signal having first and second channel signals is received at the audio signal manager 102. The audio signal manager 102 partitions the first channel signal into a first high frequency signal and a first low frequency signal at 404. In an embodiment, the channel signal partitioner 200 partitions the first channel signal into a first high frequency signal and a first low frequency signal. In an embodiment, the first low frequency signal is the bass component of the first channel signal.

The audio signal manager 102 partitions the second channel signal into a second high frequency signal and a second low frequency signal at 406. In an embodiment, the channel signal partitioner 200 partitions the second channel signal into a second high frequency signal and a second low frequency signal. In an embodiment, the second low frequency signal is the bass component of the second channel signal.

The audio signal manager 102 generates a mono low frequency signal based on the first and second low frequency signals at 408. In an embodiment, the mono signal generator 202 generates the mono low frequency signal based on the first and second low frequency signals. In an embodiment, the mono low frequency signal is a mono bass signal based on the bass components of the first and second channel signals.

The audio signal manager 102 partitions the mono low frequency signal into first and second mono low frequency signals based on an excursion limit of a high sensitivity speaker 110 at 410. In an embodiment, the mono signal partitioner 204 partitions the mono low frequency signal into first and second mono low frequency signals based on an excursion limit of a high sensitivity speaker 110. In an embodiment, the mono low frequency signal is a mono bass signal based on the bass components of the first and second channel signals and first and second mono low frequency signals are first and second mono bass signals.

The audio signal manager 102 generates a first composite channel signal based on the first high frequency signal and the first mono low frequency signal for playback by the high sensitivity speaker 110 at 412. In an embodiment, the composite signal generator 206 generates a first composite channel signal based on the first high frequency signal and the first mono low frequency signal for playback by the high sensitivity speaker 110. In an embodiment, the first composite channel signal is based on the high frequency component of the first channel signal and the first mono bass signal.

The audio signal manager 102 generates a second composite channel signal based on the second high frequency signal and the second mono low frequency signal for playback by the low sensitivity speaker 112 at 414. In an embodiment, the composite signal generator 206 generates a second composite channel signal based on the second high frequency signal and the second mono low frequency signal for playback by the low sensitivity speaker 112. In an embodiment, the second composite channel signal is based on the high frequency component of the second channel signal and the second mono bass signal.

While a series of steps have been described in connection with the method 400, a fewer number of the described steps and/or additional steps may be performed. Furthermore, while the steps have been described in a particular order, the steps in method 400 may be performed in a different order.

Exemplary Operating Environment

Figure 5:
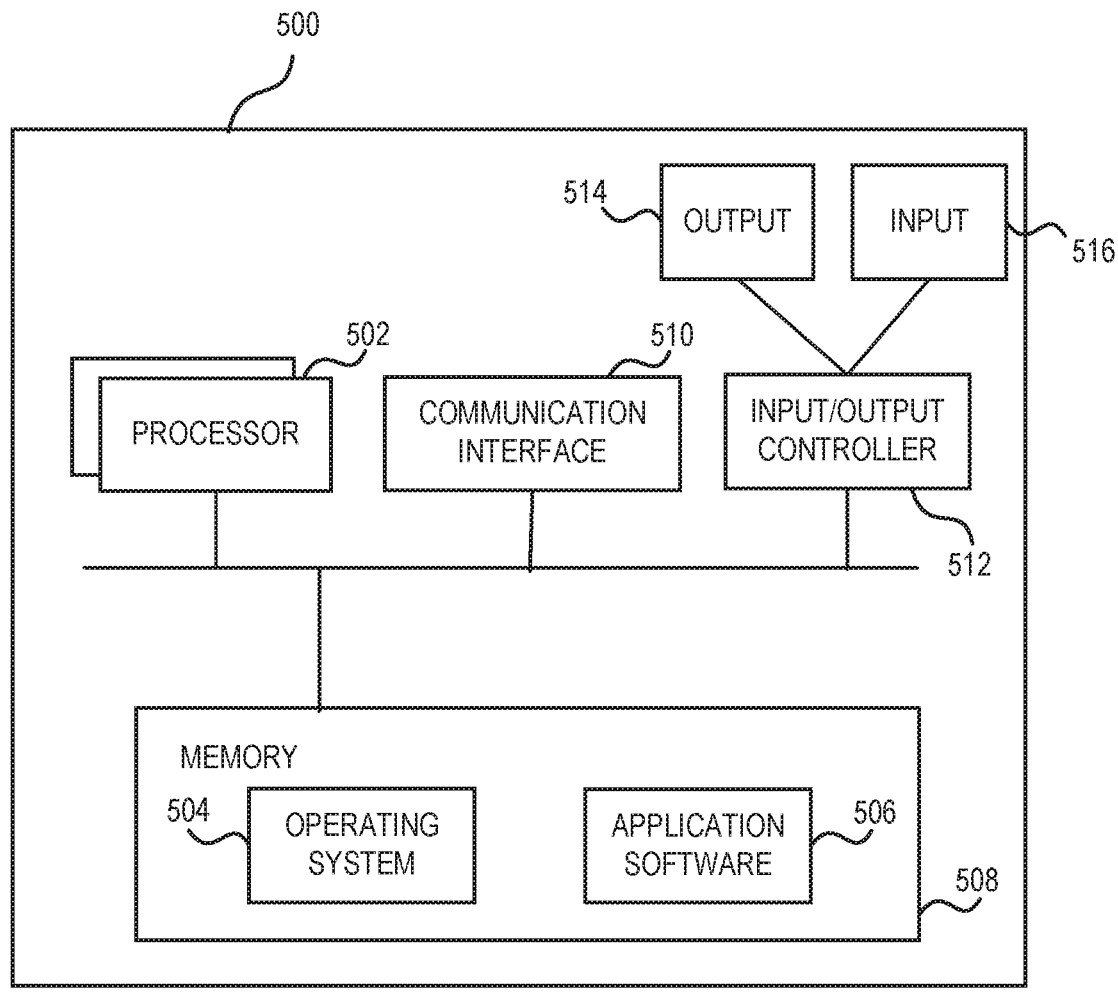
FIG. 5 is a block diagram representation of an exemplary computer apparatus.

Referring to FIG. 5, a functional block diagram representation of an exemplary computer apparatus 500 is shown. In an embodiment, components of a computing apparatus 500 may be implemented as a part of an electronic device, computing device and/or mobile computing device according to one or more embodiments described in this specification. The computing apparatus 500 comprises one or more processors 502 which may be microprocessors, controllers or any other suitable type of processors for processing computer executable instructions to control the operation of the electronic device. Platform software comprising an operating system 504 or any other suitable platform software may be provided on the computing apparatus 500 to enable application software 506 to be executed on the device. An example of an application software 506 is the audio signal manager 102.

Computer executable instructions may be provided using any computer-readable media that are accessible by the computing apparatus 500. Computer-readable media may include, for example, computer storage media such as a memory 508 and communications media. Computer storage media, such as a memory 508, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus 500. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 508) is shown within the computing apparatus 500, it will be appreciated by a person skilled in the art, that the storage may be distributed or located remotely and accessed via a network or other communication link (e.g. using a communication interface 510).

The computing apparatus 500 may comprise an input/output controller 512 configured to output information to one or more output devices 514, for example a display or a speaker, which may be separate from or integral to the electronic device. The input/output controller 512 may also be configured to receive and process an input from one or more input devices 516, for example, a keyboard, a microphone or a touchpad. In one embodiment, the output device 514 may also act as the input device. An example of such a device may be a touch sensitive display. The input/output controller 512 may also output data to devices other than the output device 514, e.g. a locally connected printing device.

The functionality described herein can be performed, at least in part, by one or more hardware logic components. According to an embodiment, the computing apparatus 500 is configured by the program code when executed by the processor to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Although some of the present embodiments may be described and illustrated as being implemented in a smartphone, a mobile phone, or a tablet computer, these are only examples of a device and not a limitation. As those skilled in the art will appreciate, the present embodiments are suitable for application in a variety of different types of devices, such as portable and mobile devices, for example, in laptop computers, tablet computers, game consoles or game controllers, various wearable devices, embedded devices, etc.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A mobile computing device comprising:
a first speaker having a first sensitivity;
a second speaker having a second sensitivity, the second sensitivity being greater than the first sensitivity; and
an audio signal manager configured to:
  receive an audio signal having first and second channel signals;
  partition the first channel signal into a first high frequency signal and a first low frequency signal;
  partition the second channel signal into a second high frequency signal and a second low frequency signal;
  generate a mono low frequency signal based on the first and second low frequency signals;
  partition the mono low frequency signal into first and second mono low frequency signals based on an excursion limit of the second speaker;
  generate a first composite channel signal based on the first high frequency signal and the first mono low frequency signal for playback by the first speaker; and
  generate a second composite channel signal based on the second high frequency signal and the second mono low frequency signal for playback by the second speaker.

2. The mobile computing device of claim 1, further comprising a digital signal processor, the audio signal manager being a component of the digital signal processor.

3. The mobile computing device of claim 1, further comprising a portable energy source configured to supply power to the first and second speakers.

4. The mobile computing device of claim 1, wherein the mobile computing device comprises a mobile phone.

5. The mobile computing device of claim 1, wherein the first speaker comprises a micro speaker of a mobile phone and the second speaker comprises a receiver speaker of a mobile phone.

6. The mobile computing device of claim 1, wherein the audio signal manager comprises:
a first high pass filter configured to receive the first channel signal and generate the first high frequency signal;
a first low pass filter configured to receive the first channel signal and generate the first low frequency signal;
a second high pass filter configured to receive the second channel signal and generate the second high frequency signal; and
a second low pass filter configured to receive the second channel signal and generate the second low frequency signal.

7. The mobile computing device of claim 1, wherein the first low frequency signal comprises a bass component of the first channel signal and the second low frequency signal comprises a bass component of the second channel signal.

8. The mobile computing device of claim 1, wherein the audio signal manager comprises a mono signal generator configured to receive the first and second low frequency signals as an input and generate the mono low frequency signal.

9. The mobile computing device of claim 1, wherein the audio signal manager comprises a mono signal partitioner configured to receive the mono low frequency signal as an input and generate the first and second mono low frequency signals based on an excursion amplitude threshold associated with the excursion limit of the second speaker.

10. The mobile computing device of claim 1, wherein the audio signal manager comprises a composite signal generator configured to:
receive the first high frequency signal and the first mono low frequency signal as inputs and generate the first composite channel signal; and
receive the second high frequency signal and the second mono low frequency signal as inputs and generate the second composite channel signal.

11. A mobile computing device comprising:
a first speaker having a first sensitivity;
a second speaker having a second sensitivity, the second sensitivity being greater than the first sensitivity, the second speaker further having an excursion limit; and
an audio signal manager configured to:
  receive an audio signal having first and second channel signals;
  partition the first channel signal into a first high frequency signal and a first low frequency signal;
  partition the second channel signal into a second high frequency signal and a second low frequency signal;
  generate a mono low frequency signal based on the first and second low frequency signals;
  partition the mono low frequency signal into first and second mono low frequency signals based on the excursion limit, the first mono low frequency signal comprising a portion of the mono low frequency signal that is above the excursion limit and the second low frequency signal comprising a portion of the mono low frequency signal that is within the excursion limit;
  generate a first composite channel signal based on the first high frequency signal and the first mono low frequency signal for playback by the first speaker; and
  generate a second composite channel signal based on the second high frequency signal and the second mono low frequency signal for playback by the second speaker.

12. The mobile computing device of claim 11, wherein the audio signal manager comprises:
a first high pass filter configured to receive the first channel signal and generate the first high frequency signal;
a first low pass filter configured to receive the first channel signal and generate the first low frequency signal;
a second high pass filter configured to receive the second channel signal and generate the second high frequency signal; and
a second low pass filter configured to receive the second channel signal and generate the second low frequency signal.

13. The mobile computing device of claim 11, wherein the first low frequency signal comprises a bass component of the first channel signal and the second low frequency signal comprises a bass component of the second channel signal.

14. The mobile computing device of claim 11, wherein the audio signal manager comprises a mono signal generator configured to receive the first and second low frequency signals as an input and generate the mono low frequency signal.

15. The mobile computing device of claim 11, wherein the audio signal manager comprises a mono signal partitioner configured to receive the mono low frequency signal as an input and generate the first and second mono low frequency signals based on an excursion amplitude threshold associated with the excursion limit of the second speaker.

16. The mobile computing device of claim 11, wherein the audio signal manager comprises a composite signal generator configured to:
receive the first high frequency signal and the first mono low frequency signal as inputs and generate the first composite channel signal; and
receive the second high frequency signal and the second mono low frequency signal as inputs and generate the second composite channel signal.

17. A digital signal processor for a mobile computing device including an audio signal manager comprising:
at least one processor; and
at least one memory comprising computer program code, the at least one memory and the computer program code configured to, with the at least one processor, to cause the audio signal manager to:
receive an audio signal having first and second channel signals;
partition the first channel signal into a first high frequency signal and a first low frequency signal;
partition the second channel signal into a second high frequency signal and a second low frequency signal;
generate a mono low frequency signal based on the first and second low frequency signals;
partition the mono low frequency signal into first and second mono low frequency signals based on an excursion limit of a first speaker;
generate a first composite channel signal based on the first high frequency signal and the first mono low frequency signal for playback by the first speaker; and
generate a second composite channel signal based on the second high frequency signal and the second mono low frequency signal for playback by a second speaker, wherein a sensitivity of the first speaker is greater than a sensitivity of the second speaker.

18. The digital signal processor of claim 17, wherein the at least one processor causes the audio signal manager to generate the first and second composite channel signals for playback by a receiver speaker of a mobile phone and a micro speaker of the mobile phone respectively.

19. The digital signal processor of claim 17, wherein the first low frequency signal comprises a bass component of the first channel signal and the second low frequency signal comprises a bass component of the second channel signal.

20. The digital signal processor of claim 19, wherein the at least one processor causes the audio signal manager to partition the mono low frequency signal into first and second mono low frequency signals based on an excursion amplitude threshold associated with the excursion limit of the first speaker.

* * * * *